(12) United States Patent
Pandey et al.

(10) Patent No.: US 10,113,389 B2
(45) Date of Patent: Oct. 30, 2018

(54) CRACK-RESISTANT CEMENT COMPOSITION

(71) Applicant: Halliburton Energy Services, Inc., Houston, TX (US)

(72) Inventors: Vandana Neeraj Pandey, Pune (IN); Dibyadarshani Senapati, Pune (IN); Abhimanyu P. Deshpande, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/502,731

(22) PCT Filed: Sep. 9, 2014

(86) PCT No.: PCT/US2014/054743
§ 371 (c)(1),
(2) Date: Feb. 8, 2017

(87) PCT Pub. No.: WO2016/039729
PCT Pub. Date: Mar. 17, 2016

(65) Prior Publication Data
US 2017/0233635 A1   Aug. 17, 2017

(51) Int. Cl.
*E21B 33/14* (2006.01)
*C09K 8/467* (2006.01)
*C04B 28/02* (2006.01)
*C04B 22/00* (2006.01)
(Continued)

(52) U.S. Cl.
CPC .......... *E21B 33/14* (2013.01); *C04B 22/0093* (2013.01); *C04B 22/06* (2013.01); *C04B 28/02* (2013.01); *C09K 8/467* (2013.01); *C04B 2111/2038* (2013.01)

(58) Field of Classification Search
None
See application file for complete search history.

(56) References Cited

U.S. PATENT DOCUMENTS 4,587,224 A    5/1986   Keefer et al.
5,420,086 A *  5/1995   Brandau .................... B01J 2/08
                                                    423/266
(Continued)

OTHER PUBLICATIONS

Green, David J. "A technique for introducing surface compression into zirconia ceramics." Journal of the American Ceramic Society 66.10 (1983).

(Continued)

*Primary Examiner* — Anuradha Ahuja
(74) *Attorney, Agent, or Firm* — McGuireWoods LLP

(57) ABSTRACT

A cement composition for use in a well that penetrates a subterranean formation comprising: cement; water; and an additive comprising zirconium dioxide, wherein at least a portion of the zirconium dioxide is in a metastable tetragonal phase, and wherein some or all of the zirconium dioxide that is in the metastable tetragonal phase transforms to a stable monoclinic phase after a stress is applied to the cement composition. The additive also reduces the dimensions of a crack located within the set cement composition. A method of cementing in a subterranean formation comprising: introducing a cement composition into the subterranean formation.

17 Claims, 5 Drawing Sheets

(51) Int. Cl.
  *C04B 22/06* (2006.01)
  *C04B 111/20* (2006.01)

(56) References Cited

U.S. PATENT DOCUMENTS

| | | | |
|---|---|---|---|
| 5,728,636 A * | 3/1998 | Nawa | C04B 35/119 |
| | | | 501/103 |
| 2006/0174802 A1 | 8/2006 | Bedel et al. | |
| 2007/0166541 A1* | 7/2007 | Smith | C04B 18/082 |
| | | | 428/402 |
| 2008/0099203 A1* | 5/2008 | Mueller | C04B 20/1022 |
| | | | 166/293 |
| 2009/0188670 A1 | 7/2009 | Xu et al. | |
| 2010/0096139 A1 | 4/2010 | Holcomb et al. | |
| 2010/0130388 A1 | 5/2010 | Phatak et al. | |

OTHER PUBLICATIONS

International Search Report and Written Opinion dated Jun. 1, 2015; International PCT Application No. PCT/US2014/054743.

Gregori, Giuliano, Wolfgang Burger, and Valter Sergo. "Piezo-spectroscopic analysis of the residual stresses in zirconia-toughened alumina ceramics: the influence of the tetragonal-to-monoclinic transformation." Materials Science and Engineering: A 271.1 (1999): 401-406.

Matsuzawa, M., and S. Horibe "Resistance against crack nucleation and propagation in Y 2 O 3 doped tetragonal zirconia ceramics." Materials Science and Engineering: A 333.1 (2002): 199-207.

* cited by examiner

CRACK-RESISTANT CEMENT COMPOSITION

TECHNICAL FIELD

Cement compositions can become cracked due to force being applied to the set cement. Cracks in a cement composition can allow undesirable fluid flow through the cracks. A crack-resistant cement composition is provided. The cement composition can be used in an oil or gas well.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
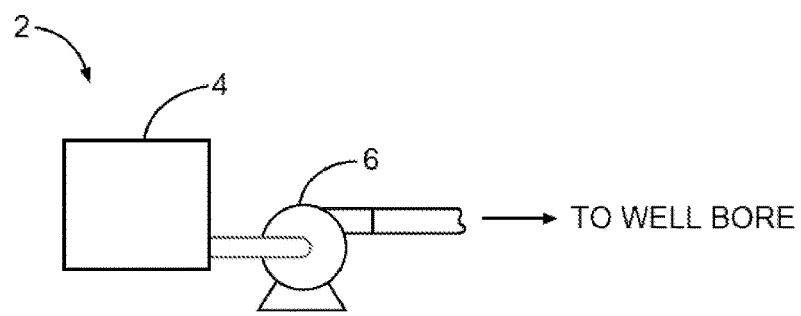
FIG. 1 illustrates a system for preparation and delivery of a cement composition to a wellbore according to certain embodiments.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore to form a cement sheath. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

As used herein, a "cement composition" is a mixture of at least cement and water. A cement composition can include additives. As used herein, the term "cement" means an initially dry substance that develops compressive strength or sets in the presence of water. An example of cement is Portland cement. A cement composition is a fluid and is generally slurry in which the water is the continuous phase of the slurry and the cement (and any other insoluble particles) is the dispersed phase. The continuous phase of a cement composition can include dissolved solids.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

During cementing operations, it is necessary for the cement composition to remain pumpable during introduction into the well and until the composition is situated in the portion of the well to be cemented. After the cement composition has reached the portion of the well to be cemented, the cement composition ultimately sets. As used herein, the term "set" and all grammatical variations thereof means the process of developing compressive strength and becoming hard or solid through curing. A cement composition that thickens too quickly while being pumped can damage pumping equipment or block tubing or pipes, and a cement composition that sets too slowly can cost time and money while waiting for the composition to set.

A set cement can develop cracks. As used herein a "crack" means a more highly permeable zone within the set cement that is characterized by having a greater length compared to diameter and is different from the permeability due to the porosity of the set cement. Porosity refers to the number of individual pores within the set cement, while permeability due to the porosity refers to the amount of interconnectivity between the individual pores that allows fluid to migrate or move between the interconnected pores. By contrast, a crack does not mean interconnected pores, but rather is a continuous void having a length that is greater than its diameter. The cracks can be microscopic and can have dimensions as small as 0.1 micrometers and as large as 50 micrometers or larger.

Cracks can develop due to a load being applied to the set cement sheath during wellbore operations, plate tectonic movement, and/or mechanical failure (due to inadequate compressive strength for example) of the set cement. Cracks are generally undesirable because they facilitate fluid flow through the cement sheath. This fluid flow can increase fluid loss into the subterranean formation, or result in premature fluid flow into the wellbore or an increase in fluid flow between wellbore intervals, thus decreasing or eliminating zonal isolation. Therefore, there is an ongoing need and industry-wide concern for cement composition additives that can self-repeal or repair cracks in a set cement sheath.

It has been discovered that an additive of zirconium dioxide ($ZrO_2$), also known as zirconia, can be used to repair cracks in set cement compositions. Zirconia has three phases: monoclinic, tetragonal, and cubic. The tetragonal phase can be a metastable. During an applied stress, for example, during the cracking of the set cement sheath, the metastable tetragonal phase can convert to the monoclinic phase. The monoclinic phase is more stable and thus in a lower energy state compared to the metastable tetragonal phase. This phase transformation is known as transformation toughening. The zirconia undergoes a volume expansion during this phase transformation. This phase transformation can then repair the crack, retard further growth of the crack, and increase the fracture toughness up to four times. The novel additive can also include another metal oxide to help the zirconia to remain in the monoclinic phase after transformation.

If any laboratory test (e.g., thickening time) requires the step of mixing, then the cement composition is mixed according to the following procedure. The water is added to a mixing container and the container is then placed on a mixer base. The motor of the base is then turned on and maintained at 4,000 revolutions per minute "rpm" (+/−200 rpm). The cement and any other ingredients, such as the additive, are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s).

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. The compressive strength of a cement composition can be used to indicate whether the cement composition has initially set or is set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

According to an embodiment, a cement composition for use in a well that penetrates a subterranean formation comprises: cement; water; and an additive comprising zirconium dioxide, wherein at least a portion of the zirconium dioxide is in a metastable tetragonal phase, and wherein some or all of the zirconium dioxide that is in the metastable tetragonal phase transforms to a stable monoclinic phase after a stress is applied to the cement composition. The additive can also reduce the dimensions of a crack or eliminate the crack located within the set cement composition.

According to another embodiment, a method of cementing in a subterranean formation comprises: introducing a cement composition into the subterranean formation.

It is to be understood that the discussion of preferred embodiments regarding the cement composition or any ingredient in the cement composition, is intended to apply to the composition embodiments and the method embodiments. Any reference to the unit "gallons" means U.S. gallons.

The cement composition includes cement. The cement can be a hydraulic cement. A variety of hydraulic cements may be utilized including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, and combinations thereof. In certain embodiments, the hydraulic cement may comprise a Portland cement. In some embodiments, the Portland cements are classified as Classes A, C, H, and G cements according to American Petroleum Institute, API Specification for Materials and Testing for Well Cements, API Specification 10, Fifth Ed., Jul. 1, 1990. Preferably, the cement is Class G or Class H cement.

The cement composition includes water. The water can be selected from the group consisting of freshwater, brackish water, and saltwater, in any combination thereof in any proportion. The cement composition can also include a water-soluble salt. Preferably, the salt is selected from sodium chloride, calcium chloride, calcium bromide, potassium chloride, potassium bromide, magnesium chloride, and any combination thereof in any proportion. The salt can be in a concentration in the range of about 0.1% to about 40% by weight of the water.

According to an embodiment, the cement composition has a density of at least 9 pounds per gallon "ppg" (1.1 kilograms per liter "kg/L"). The cement composition can have a density in the range of about 9 to about 22 ppg (about 1.1 to about 2.6 kg/L).

The cement composition includes the additive. The additive comprises zirconium dioxide ($ZrO_2$). At least a portion of the zirconium dioxide is in a metastable tetragonal phase. All of the zirconium dioxide can be in the metastable tetragonal phase. According to certain embodiments, the amount of zirconium dioxide that is in the metastable tetragonal phase is at least a sufficient amount that any cracks that develop in the set cement composition are repaired or at least the crack dimensions are reduced. By way of example, depending on the concentration of the zirconium dioxide and additive, it may be necessary for 60% or more of the zirconium dioxide to be in the metastable tetragonal phase in order to repair the cracks.

Some or all of the zirconium dioxide that is in the metastable tetragonal phase transforms to a stable monoclinic phase after a stress is applied to the cement composition. The additive can further include an additional metal oxide. The additional metal oxide can help the zirconium dioxide remain in the metastable tetragonal phase during the step of introducing the cement composition into the subterranean formation. Examples of suitable additional metal oxides include, but are not limited to, aluminum oxide ($Al_2O_3$) and other transition metal oxides. The ratio of zirconium dioxide to additional metal oxide can be in the range of about 9:1 to about 1:1. The ratio of zirconium dioxide to additional metal oxide can also be selected such that the majority or all of the zirconium dioxide that is in the metastable tetragonal phase remains in the metastable tetragonal phase.

The phase transformation can occur after the cement composition has set. The stress that is applied to the set cement composition can be a physical force. The physical force can cause one or more cracks to form within the set cement composition. The one or more cracks can be a variety of shapes and sizes. By way of example, the cracks can have a largest dimension in the range of about 0.1 micrometers (μm) to about 1 millimeter (mm). In order for the crack to be completely healed, the crack may have a largest dimension that is less than 1 mm or less than 500 μm.

The zirconium dioxide is in the metastable tetragonal phase during the step of introducing the cement composition into the subterranean formation. In this manner, the zirconium dioxide is able to undergo a phase transformation into the stable monoclinic phase after introduction into the subterranean formation. The zirconium dioxide undergoes a volume expansion during the phase transformation. As discussed above, the zirconium dioxide can undergo the phase transformation after the cement composition has set and a stress is applied to the set cement composition. The volume expansion can then fill the cracks that are induced in the set cement composition. The volume expansion can vary and can be as great as about 3%-5%. According to certain embodiments, the zirconium dioxide at least causes the dimensions (i.e., length and/or diameter) of one or more cracks located within the set cement composition to become reduced. The zirconium dioxide can also completely fill the crack(s) within the set cement composition. The reduction of the dimensions or complete filling of the cracks can reduce the permeability at these locations.

The rate at which the phase transformation of the zirconium dioxide can be increased via a catalyst. An example of a catalyst is water. Accordingly, any water remaining in the set cement composition or any water that can migrate through the set cement composition can increase the phase transformation and result in cracks that are repaired much faster than without the catalyst.

The additive can be in a concentration in the range of about 1% to about 10% by weight of the cement (bwoc). The zirconium dioxide can be in a concentration in the range of about 10% to about 50% by weight of the additive. The zirconium dioxide can also be in a concentration in the range of about 0.1% to about 25% by weight of the cement. The zirconium dioxide can also be in at least a sufficient concentration such that the dimensions of the one or more cracks in the set cement composition are reduced or such that the crack(s) are repaired (i.e., the crack is completely filled).

It is to be understood that while the cement composition can contain other ingredients, it is the additive that is primarily or wholly responsible for repairing cracks in the set cement composition. For example, a test cement composition consisting essentially of, or consisting of, the cement, the water, and the additive, and in the same proportions as the cement composition, can have repaired cracks. Therefore, it is not necessary for the cement composition to include other additives, such as other healing or repairing additives. It is also to be understood that any discussion related to a "test cement composition" is included for purposes of demonstrating that the cement composition can contain other ingredients, but it is the additive that partially or fully repairs the cracks. Therefore, while it may not be possible to test the specific cement composition used in a wellbore operation in a laboratory, one can formulate a test cement composition to identify if the ingredients and concentration of the ingredients will provide the stated property (e.g., the dimensions of the cracks are reduced or the cracks are repaired).

The cement composition can have a thickening time in the range of about 5 to about 15 hours, alternatively of about 10 to about 12 hours, at the bottomhole temperature and pressure of the subterranean formation. As used herein, the term "bottomhole" means the location within the subterranean formation where the cement composition is situated.

The cement composition can have a compressive strength greater than 1,000 psi (7 MPa), preferably greater than 2,000 psi (14 MPa), at the bottomhole temperature of the subterranean formation.

The cement composition can have an initial setting time of less than 48, preferably less than 24, hours at the bottomhole temperature of the subterranean formation. The cement composition can have a setting time of less than 48, preferably less than 24, hours at the bottomhole temperature of the subterranean formation.

The cement composition can further include other additives. Examples of other additives include, but are not limited to, a filler, a friction reducer, a light-weight additive, a defoaming agent, a high-density additive, a mechanical property enhancing additive, a lost-circulation material, a filtration-control additive, a thixotropic additive, a set retarder, a set accelerator, and combinations thereof.

The cement composition can include a filler. Suitable examples of fillers include, but are not limited to, fly ash, sand, clays, and vitrified shale. Preferably, the filler is in a concentration in the range of about 5% to about 50% bwoc.

The cement composition can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. Preferably, the friction reducer is in a concentration in the range of about 0.1% to about 10% bwoc.

Commercially-available examples of other additives include, but are not limited to, and are marketed by Halliburton Energy Services, Inc. under the tradenames HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

FIG. 1 illustrates a system that can be used in the preparation of a cement composition and delivery to a wellbore according to certain embodiments. As shown, the cement composition can be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 can be located on one or more cement trucks. In some embodiments, a jet mixer can be used, for example, to continuously mix the cement composition, including water, as it is being pumped to the wellbore.

Figure 2A:
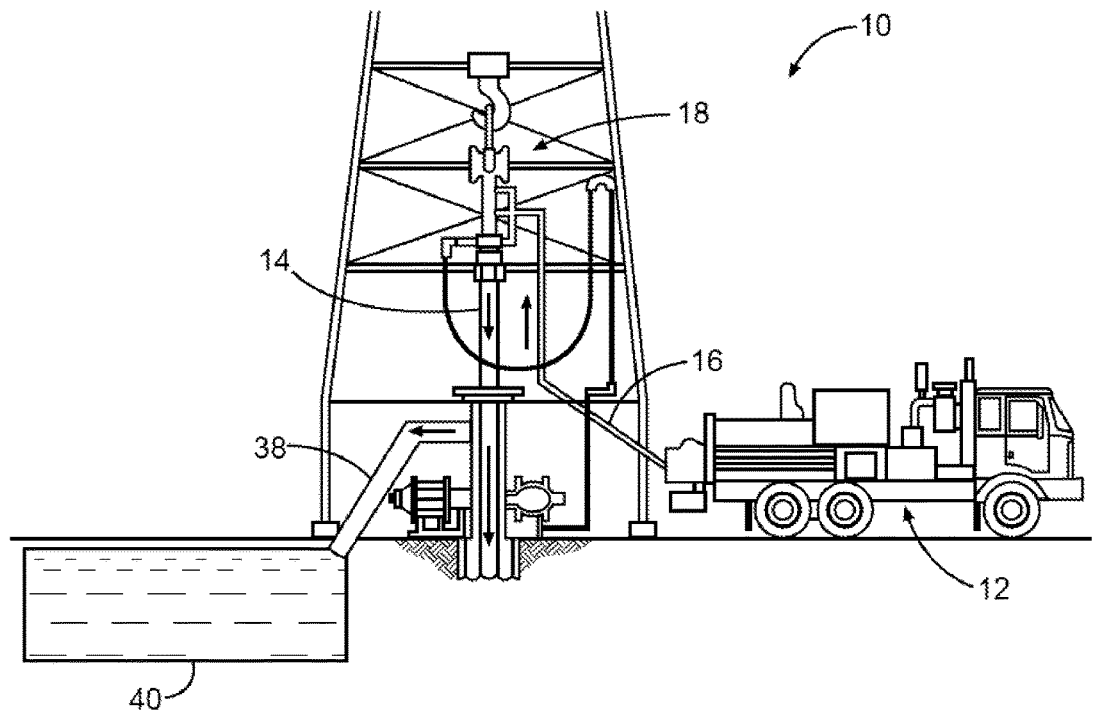
FIG. 2A illustrates surface equipment that may be used in placement of a cement composition into a wellbore.

An example technique and system for introducing the cement composition into a subterranean formation will now be described with reference to FIGS. 2A and 2B. FIG. 2A illustrates surface equipment 10 that can be used to introduce the cement composition. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. The surface equipment 10 can include a cementing unit 12, which can include one or more cement trucks, mixing equipment 4, and pumping equipment 6 (e.g., as depicted in FIG. 1). The cementing unit 12 can pump the cement composition 14 through a feed pipe 16 and to a cementing head 18, which conveys the cement composition 14 downhole.

The method embodiments include the step of introducing the cement composition into the subterranean formation 20. Turning now to FIG. 2B, the cement composition 14 can be introduced into a subterranean formation 20. The step of introducing can include pumping the cement composition into the subterranean formation using one or more pumps 6. The step of introducing can be for the purpose of at least one of the following: well completion; foam cementing; primary or secondary cementing operations; well-plugging; squeeze cementing; and gravel packing. The cement composition can be in a pumpable state before and during introduction into the subterranean formation 20. In an embodiment, the subterranean formation 20 is penetrated by a well 22. The well can be, without limitation, an oil, gas, or water production well, an injection well, a geothermal well, or a high-temperature and high-pressure (HTHP) well. According to this embodiment, the step of introducing includes introducing the cement composition into the well 22. The wellbore 22 comprises walls 24. A surface casing 26 can be inserted into the wellbore 22. The surface casing 26 can be cemented to the walls 24 via a cement sheath 28. One or more additional conduits (e.g., intermediate casing, production casing, liners, etc.) shown here as casing 30 can also be disposed in the wellbore 22. One or more centralizers 34 can be attached to the casing 30, for example, to centralize the casing 30 in the wellbore 22 prior to and during the cementing operation. According to another embodiment, the subterranean formation 20 is penetrated by a wellbore 22 and the well includes an annulus 32 formed between the casing 30 and the walls 24 of the wellbore 22 and/or the surface casing 26. According to this other embodiment, the step of introducing includes introducing the cement composition into a portion of the annulus 32.

Figure 2B:
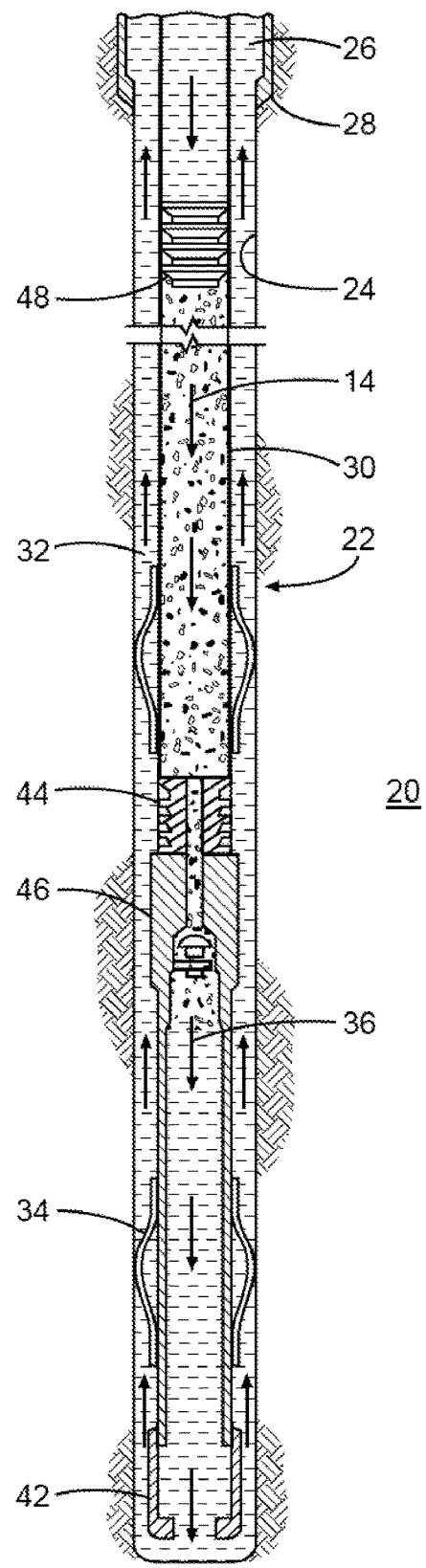
FIG. 2B illustrates placement of a cement composition into an annulus of a wellbore.

With continued reference to FIG. 2B, the cement composition 14 can be pumped down the interior of the casing 30. The cement composition 14 can be allowed to flow down the interior of the casing 30 through the casing shoe 42 at the bottom of the casing 30 and up around the casing 30 into the annulus 32. While not illustrated, other techniques can also be utilized for introduction of the cement composition 14. By way of example, reverse circulation techniques can be used that include introducing the cement composition 14 into the subterranean formation 20 by way of the annulus 32 instead of through the casing 30.

As it is introduced, the cement composition 14 may displace other fluids 36, such as drilling fluids and/or spacer fluids that may be present in the interior of the casing 30 and/or the annulus 32. At least a portion of the displaced fluids 36 can exit the annulus 32 via a flow line 38 and be deposited, for example, in one or more retention pits 40 (e.g., a mud pit), as shown on FIG. 2A. Referring again to FIG. 2B, a bottom plug 44 can be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 can be introduced into the wellbore 22 behind the cement composition 14. The top plug 48 can separate the cement composition 14 from a displacement fluid 50 and also push the cement composition 14 through the bottom plug 44.

The method embodiments also include the step of allowing the cement composition to set. The step of allowing can be performed after the step of introducing the cement composition into the subterranean formation. The cement composition can have one or more cracks that are formed within the cement composition during or after setting. The cracks can be formed by an applied force or temperature. The applied force can be without limitation, a pressure from wellbore or reservoir fluids, pressure from downhole tools or equipment, plate tectonic movement, or earthquakes. The methods can further include allowing some or all of the zirconium dioxide that is in the metastable tetragonal phase to transform to the stable monoclinic phase. The step of allowing the phase transformation of the zirconium dioxide can occur during or after the crack formation. The method embodiments can include the additional steps of perforating, fracturing, or performing an acidizing treatment, after the step of allowing.

EXAMPLES

To facilitate a better understanding of the present invention, the following examples of certain aspects of preferred embodiments are given. The following examples are not the only examples that could be given according to the present invention and are not intended to limit the scope of the invention.

For FIGS. 3-8, cement compositions were prepared having a density of 15.8 pounds per gallon (ppg) (1.9 kilograms per liter "kg/L") and contained the following ingredients: 332.25 grams (g) of tap water; 700 g Class G cement; and 35 g of a 20% zirconium dioxide to 80% aluminum oxide additive. Cement cubes were cured at 140° F. (60° C.) for 24 hour underwater. The cured samples were then cooled and subsequently subjected to cracking by applying pressure. The samples were scanned both before and after the cracking using a high resolution optical microscope—Olympus (SZX7) with imaging system to observe the crack and its subsequent healing.

Figure 3:
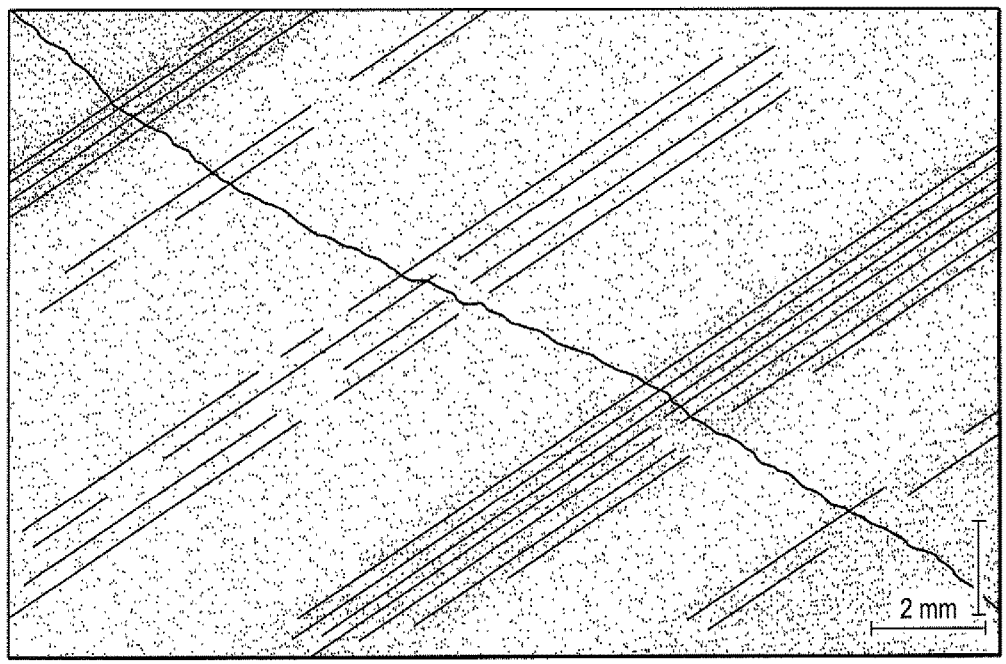
FIG. 3 is a photograph of a control set cement composition that did not contain an additive for healing the cracks in the cement.

FIG. 3 is a photograph of a control set cement composition that did not contain an additive for healing the cracks in the cement. As can be seen, the crack is still very visible and large.

Figure 4:
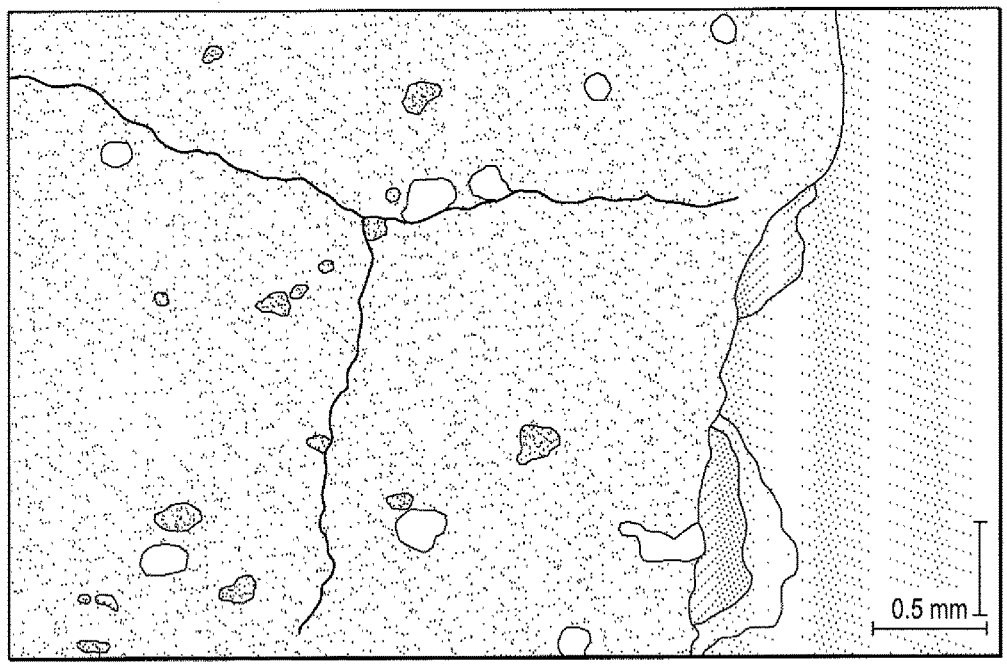
FIG. 4 is a photograph of a set cement composition and additive after healing for 2 days in a dry environment.

FIG. 4 is a photograph of a set cement composition and additive after healing for 2 days in a dry environment at ambient pressure. As can be seen, the cracks are still visible; however, the ends of the cracks appear to be healing and becoming filled from the additive.

Figure 5:
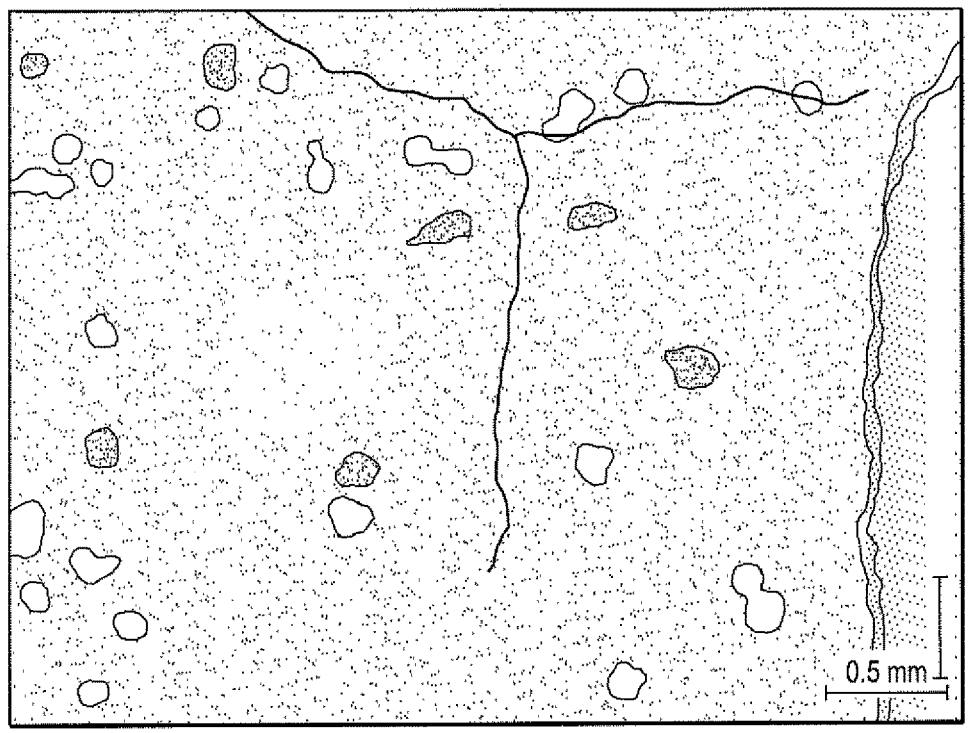
FIG. 5 is a photograph of a set cement composition and additive after healing for 1 day in a wet environment.

FIG. 5 is a photograph of a set cement composition and additive after healing for 1 day in a wet environment. The wet environment added water to the cement, thus serving as a catalyst for the transformation of the zirconium dioxide in the additive. As can be seen, the water greatly accelerated the healing of the cracks compared to the cement sample that was healed for 2 days in the dry environment. This shows that the addition of water as a catalyst can greatly increase the healing rate of the additive.

Figure 6:
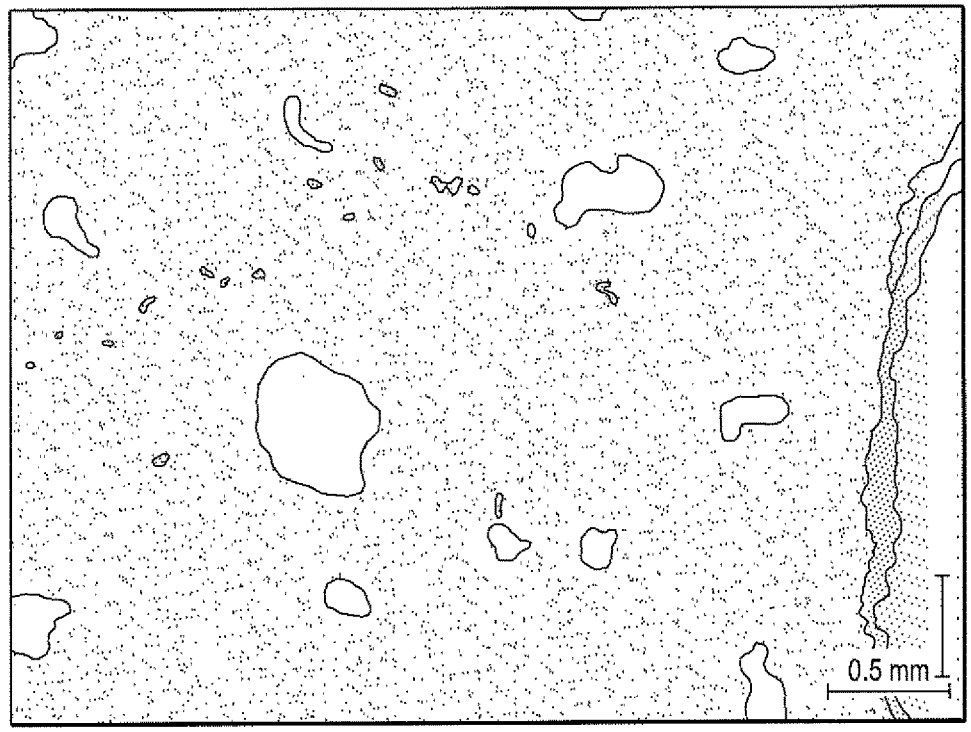
FIG. 6 is a photograph of a set cement composition and additive after healing for 3 days in a wet environment.

FIG. 6 is a photograph of a set cement composition and additive after healing for 3 days in a wet environment. As can be seen, the cracks are barely visible and a substantial part of the cracks have been filled by the additive.

Figure 7:
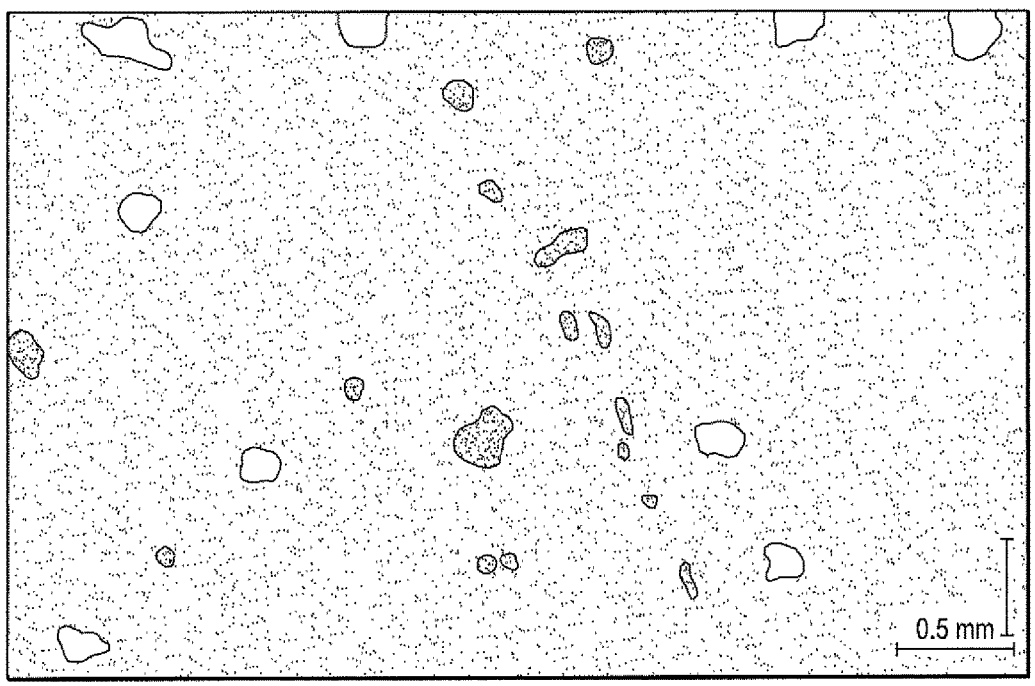
FIG. 7 is a photograph of a set cement composition and additive after healing for 5 days in a wet environment.

FIG. 7 is a photograph of a set cement composition and additive after healing for 5 days in a wet environment. As can be seen, the cracks are no longer noticeable. This indicates that the additive functions to completely fill the cracks, thus eliminating fluid flow through the cracks.

Figure 8:
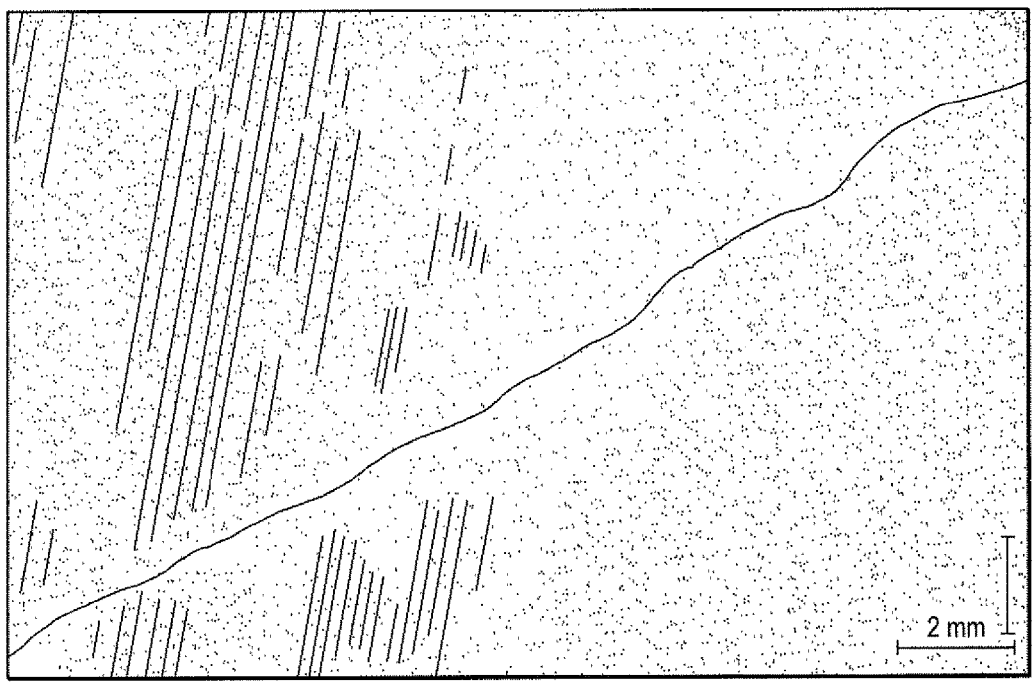
FIG. 8 is a photograph of a set cement composition and additive after healing for 3 days in a wet environment at a pressure of 3,000 psi.

FIG. 8 is a photograph of a set cement composition and additive after healing for 3 days in a wet environment at a pressure of 3,000 psi. As can be seen, the additive has almost completely filled the crack and at a minimum, substantially reduced the dimensions of the crack.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

As used herein, the words "comprise," "have," "include," and all grammatical variations thereof are each intended to have an open, non-limiting meaning that does not exclude additional elements or steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
   introducing a cement composition into the subterranean formation, wherein the cement composition comprises:
   (A) cement;
   (B) water; and
   (C) an additive comprising zirconium dioxide, wherein at least 60% of the zirconium dioxide is in a metastable tetragonal phase during the step of introducing, and wherein some or all of the zirconium dioxide that is in the metastable tetragonal phase transforms to a stable monoclinic phase after a stress is applied to the cement composition;
   allowing or causing to allow the cement composition to set;
   allowing or causing to allow the stress to induce a crack in the set cement composition; wherein the stress further induces at least a portion of the zirconium dioxide that is in the metastable tetragonal phase to transform to the stable monoclinic phase; wherein this transformation reduces the size of at least one dimension of the crack.

2. The method according to claim 1, wherein the cement is selected from the group consisting of Portland cements, gypsum cements, high alumina content cements, slag cements, high magnesia content cements, and combinations thereof.

3. The method according to claim 1, wherein the water is selected from the group consisting of freshwater, brackish water, and saltwater, in any combination thereof in any proportion.

4. The method according to claim 1, wherein the cement composition further comprises a water-soluble salt.

5. The method according to claim 4, wherein the salt is selected from sodium chloride, calcium chloride, calcium bromide, potassium chloride, potassium bromide, magnesium chloride, and any combination thereof in any proportion.

6. The method according to claim 1, wherein all of the zirconium dioxide is in the metastable tetragonal phase during the step of introducing.

7. The method according to claim 1, wherein the additive further comprises an additional metal oxide.

8. The method according to claim 7, wherein the additional metal oxide is selected from the group consisting of aluminum oxide and transition metal oxides.

9. The method according to claim 7, wherein the ratio of zirconium dioxide to additional metal oxide is in the range of about 9:1 to about 1:1.

10. The method according to claim 1, wherein the additive is in a concentration in the range of about 1% to about 10% by weight of the cement.

11. The method according to claim 1, wherein the zirconium dioxide is in a concentration in the range of about 10% to about 50% by weight of the additive.

12. The method according to claim 1, wherein the zirconium dioxide is in a concentration in the range of about 0.1% to about 25% by weight of the cement.

13. The method according to claim 1, wherein the subterranean formation is penetrated by a well.

14. The method according to claim 13, wherein the well is an oil, gas, or water production well, an injection well, a geothermal well, or a high-temperature and high-pressure well.

15. The method according to claim 1, further comprising mixing the cement composition using mixing equipment.

16. The method according to claim 1, wherein the cement composition is introduced into the subterranean formation using one or more pumps.

17. The method according to claim 1, wherein the additive completely fills the crack within the set cement composition.

* * * * *